United States Patent [19]
Meisenburg et al.

[11] Patent Number: 4,872,531
[45] Date of Patent: Oct. 10, 1989

[54] MARINE STERN DRIVE WITH THROUGH-HOUSINGS LUBRICATION SYSTEM

[75] Inventors: Gary L. Meisenburg, Fond du Lac; Francis E. Bertram, Malone; Jack L. Golz, Oshkosh, all of Wis.

[73] Assignee: Brunswick Corporation, Skokie, Ill.

[21] Appl. No.: 160,587

[22] Filed: Feb. 26, 1988

[51] Int. Cl.[4] ............................................. F01M 1/18
[52] U.S. Cl. ..................................... 184/6.4; 184/65; 137/614.04; 137/854; 440/88; 440/112; 285/161
[58] Field of Search ................................. 184/65, 6.4; 137/614.04, 854, 587, 526, 381, 377; 440/112, 88, 111; 285/161; 277/168

[56] References Cited

U.S. PATENT DOCUMENTS

| | | | |
|---|---|---|---|
| 900,280 | 10/1908 | Hoffman | 184/65 |
| 2,628,799 | 2/1953 | Aaby | 285/161 |
| 2,706,646 | 4/1955 | Olson | 137/614.04 |
| 2,730,380 | 1/1956 | Espy et al. | 137/614.04 |
| 2,926,934 | 3/1960 | Gill | 137/614.04 |
| 3,174,508 | 3/1965 | Zahuranec | 137/614.04 |
| 3,335,817 | 2/1967 | Horning | 184/6.21 |
| 3,396,693 | 8/1968 | Bergstedt | 440/112 |
| 4,224,464 | 9/1980 | Bunnell et al. | 285/161 |
| 4,371,348 | 2/1983 | Blanchard | 440/88 |
| 4,572,120 | 2/1986 | Matsumoto | 123/196 S |
| 4,671,773 | 6/1987 | Friedle et al. | 440/88 |
| 4,696,322 | 9/1987 | Knapp et al. | 137/854 |
| 4,735,590 | 4/1988 | Mondek | 440/88 |
| 4,764,135 | 8/1988 | McCormick | 440/88 |

FOREIGN PATENT DOCUMENTS

| | | | |
|---|---|---|---|
| 179496 | 10/1984 | Japan | 440/112 |
| 864110 | 3/1961 | United Kingdom | 285/161 |

Primary Examiner—Donald E. Stout
Attorney, Agent, or Firm—Robert C. Curfiss

[57] ABSTRACT

A marine stern drive unit (1) includes an assemblage of a propeller-carrying drive shaft housing (10), a bell housing (9) and gimbal housing (8). Mating flow-through passages (21, 23) are disposed in the drive shaft housing and bell housing, and a dual control valve system (30, 31) joins the passages at their juncture. The valve system is arranged to be open when the two housings are assembled, but closes automatically when the housings are disassembled to retain lubricant in the separate housing assembles when the latter are separated for servicing. The valve system includes a valve (31) in one of the passages (23) which is constructed to be snapped together and to be held firmly within the passage, but manually and quickly releasable therefrom when desired. The fluid passage (23, 26) in the bell housing communicates to the gimbal housing which has a sealed fitting (60) and a lubricant carrying portion (65) passing through the usual gimbal mounting hole (14) of the boat transom (2). An inboard container (71) connected to the gimbal housing passage (66) permits inspection of the level and condition of the lubricant. The container has a one-way valve (78) therein which prevents outward leakage of lubricant fluid, but which permits sucking back of lubricant into the system during engine cooling.

13 Claims, 3 Drawing Sheets

MARINE STERN DRIVE WITH THROUGH-HOUSINGS LUBRICATION SYSTEM

BACKGROUND AND SUMMARY OF THE INVENTION

This invention relates to a marine stern drive having a through-housings lubrication system. More particularly, the invention involves a stern drive adapted to be mounted externaly of the transom of a boat and which is driven by an inboard engine. The stern drive includes a gimbal housing, bell housing and drive shaft housing which form an assembly for carrying and driving a propeller. The various components of the assembly must be supplied with lubricating fluid therein for the moving parts of the drive, and it is desirable to be able to readily check and fill to the proper level and check the condition of the fluid.

Lubricating systems for submerged driving mechanisms are known. See, for example, U.S. Pat. No. 3,335,817. In that patent, an underwater drive unit has a lubricant chamber 32 therein which is connected through the bottom 10 of a boat and to a clear inspection chamber 85 mounted within the boat and which is connected to the intake manifold of an inboard engine 12.

Another known lubricating system having inspection capabilities within the boat has been in kit form, wherein a special hole was drilled through the transom and a hose passed therethrough and connected the stern drive assembly with a clear inspection container. This required various brackets and fasteners which were not only poor from an aesthetic standpoint, but which were subject to corrosion and other physical damage.

Other lubricant checking systems have included a dip stick disposed in an inboard heavy reservoir cast into the inner transom plate. In other instances, a removable full level plug was disposed in the drive shaft housing, but plug removal for checking required that the boat be removed from the water. It is an object of the present invention to provide a stern drive arrangement having numerous advantages over those of the previously mentioned known devices.

In accordance with the various aspects of the invention, a stern drive unit includes an assemblage of a propeller-carrying drive shaft housing, a bell housing and gimbal housing. Mating flow-thru passages are disposed in the drive shaft housing and bell housing, and a dual control valve system joins the passages at their juncture. The valve system is arranged to be open when the two housings are assembled, but closes automatically when the housings are disassembled to retain lubricant in the separate housing assemblies when the latter are separated for servicing. The valve system includes a valve in one of the passages which is constructed to be snapped together and to be held firmly within the passage, but manually and quickly releasable therefrom when desired.

The fluid passage in the bell housing communicates to the gimbal housing which has a sealed fitting and a lubricant carrying portion passing through the usual gimbal mounting hole of the boat transom. Lubricant thus passes through the various housings themselves, and does not require drilling of special holes in the transom.

An inboard reservoir container connected to the gimbal housing passage permits inspection of the level and condition of the lubricant. The container has a one-way valve therein which prevents outward leakage of lubricant fluid, but which permits sucking back of lubricant into the system during drive cooling.

BRIEF DESCRIPTION OF THE DRAWINGS

The accompanying drawings illustrate the best mode presently contemplated by the inventors for carrying out the invention.

In the drawings.

DESCRIPTION OF THE PREFERRED EMBODIMENT

Figure 1:
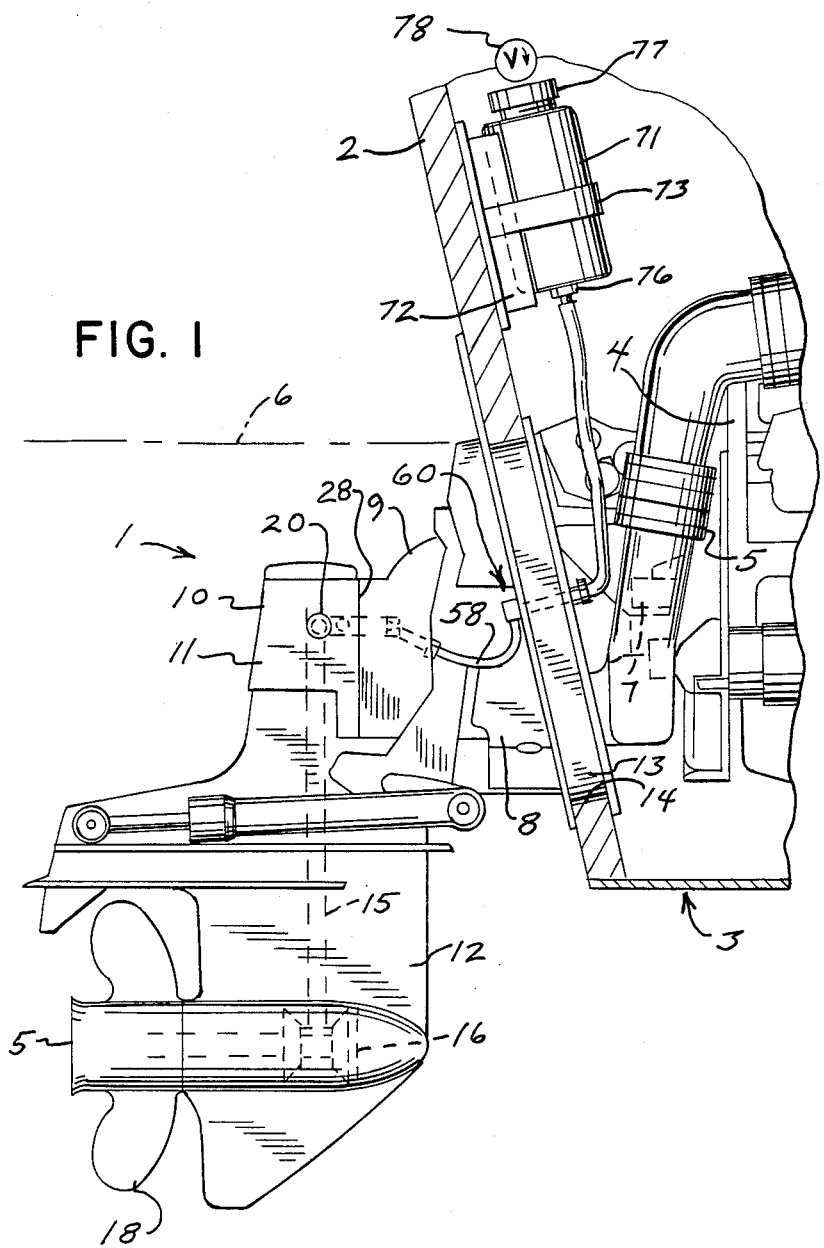
FIG. 1 is a generally schematic side elevation of a marine stern drive system incorporating the various aspects of the invention, with parts broken away and in section.

As shown in FIG. 1 of the drawings, the various aspects of the invention are incorporated in a marine stern drive unit 1 adapted to be mounted in any suitable well-known way to the transom 2 of a boat 3 having an inboard engine 4 which has an exhaust discharge 5 beneath the water level 6, and furthermore which has a suitable drive output 7. Stern drive unit 1 is connected to engine drive output 7, and includes an assemblage of a gimbal housing 8, a bell housing 9 and also a drive shaft housing 10 with the latter forming an upper gear case 11 and lower gear case 12. Housing 8, 9 and 10 contain the usual well-know working parts of stern drive unit 1 and are adapted to be removably secured together as by bolts, not shown. Likewise, gimbal housing 8 is removably mounted to transom 2 as by bolts, not shown, and has a housing portion 13 extending forwardly through the usual enlarged opening 14 in the transom.

Engine drive output 7 connects via suitable connected shafts and gearing through housings 8, 9 and 10, with drive shaft housing 10 having a vertical drive shaft 15 therewithin which connects through the usual gearing 16 to a horizontal shaft 17 to which is mounted a propeller 18.

A lubricating system for maintaining the moving parts within stern drive unit 1 in working order includes an L-shaped horizontal passage 19 in drive shaft housing 10. One leg 20 of passage 19 opens into a suitable oil chamber in the upper gear case portion 11 of housing 10, and the other connecting leg 21 thereof opens to an outer face 22 of housing 10. The lubricating system further includes a horizontal passage 23 in bell housing 9 which opens to an outer face 24 of the latter. Passage 23 has an inner end portion providing an abutment 25 and a downwardly angled portion 26 which opens to a further outer face 27 of bell housing 9.

Figure 3:
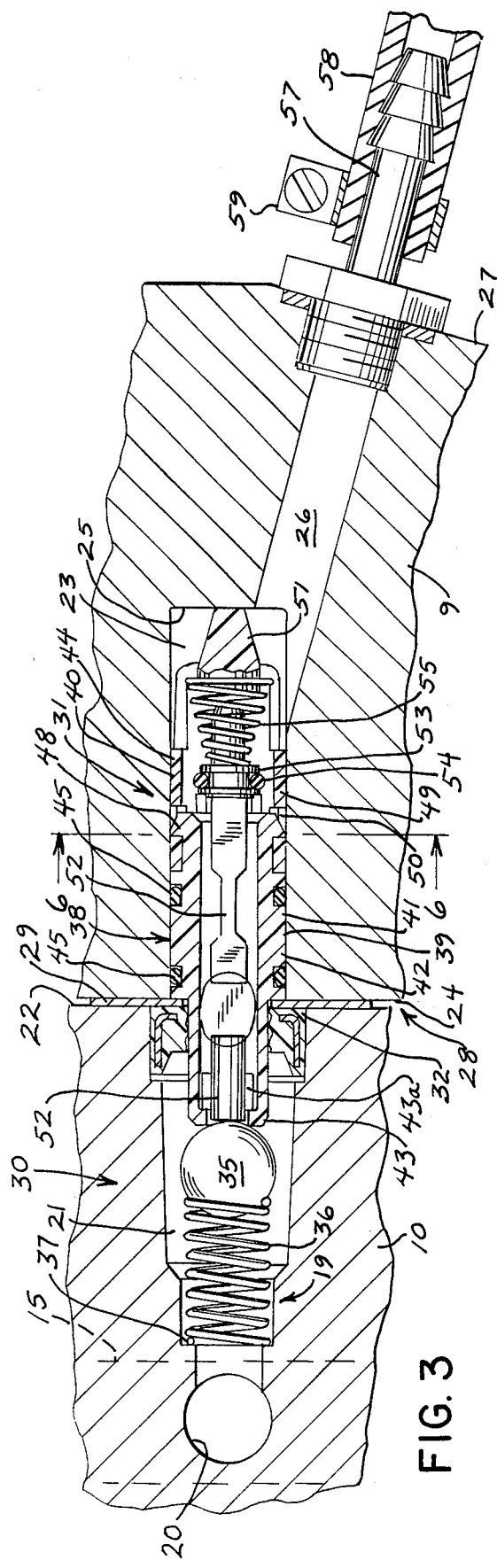
FIG. 3 is an enlarged vertical partially sectional view of the mating passages in the assembled drive shaft housing and bell housing, and showing the control valve system therein.

As best shown in FIG. 3, when stern drive unit 1 is fully assembled, bell housing 9 and drive shaft housing 10 are disposed with their respective outer faces 24 and 22 in closely facing relationship, forming an interface 28 therebetween. The ends of respective passages 23 and 21 are in registry to effectively form a continuous housing passage, with a seal 29 provided thereat.

During normal stern drive operation, it is desired that lubricating fluid be able to freely flow in either direction between drive shaft housing 10 and bell housing 9. However, it is also desired to prevent such flow when the housings are disassembled. For this purpose, reversible one-way valve means are provided at interface 28 which are normally open when the unit is assembled, but which automatically close when the unit is disassembled for servicing or the like.

Figure 4:
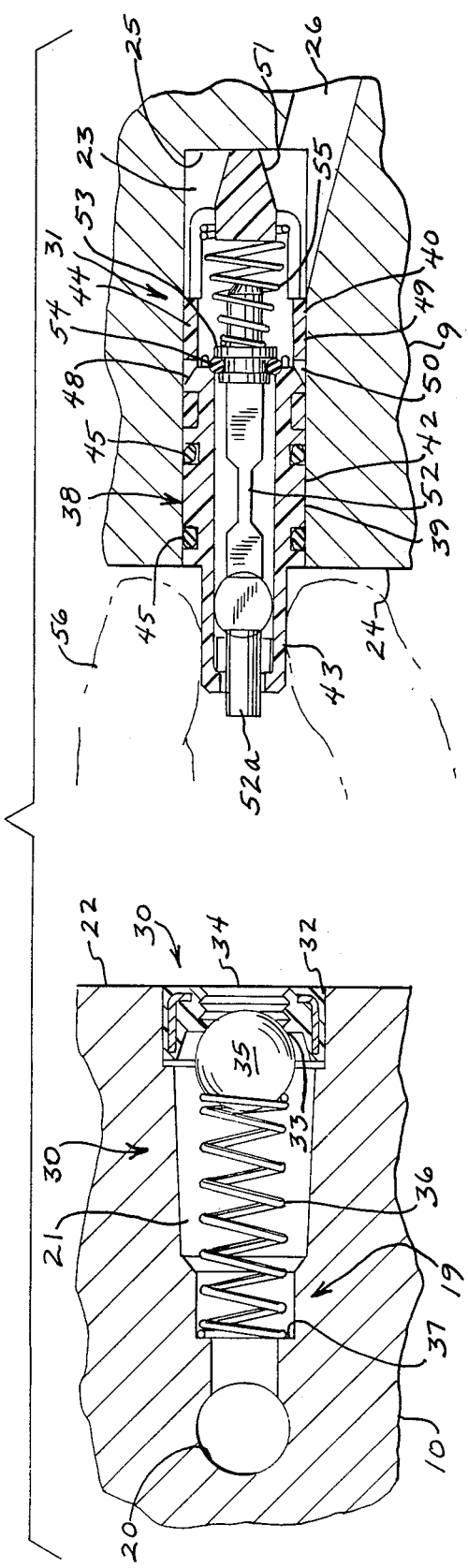
FIG. 4 is a view illustrating disassembly of the drive shaft housing and bell housing, and showing the resultant closing of the valves.
Figure 5:
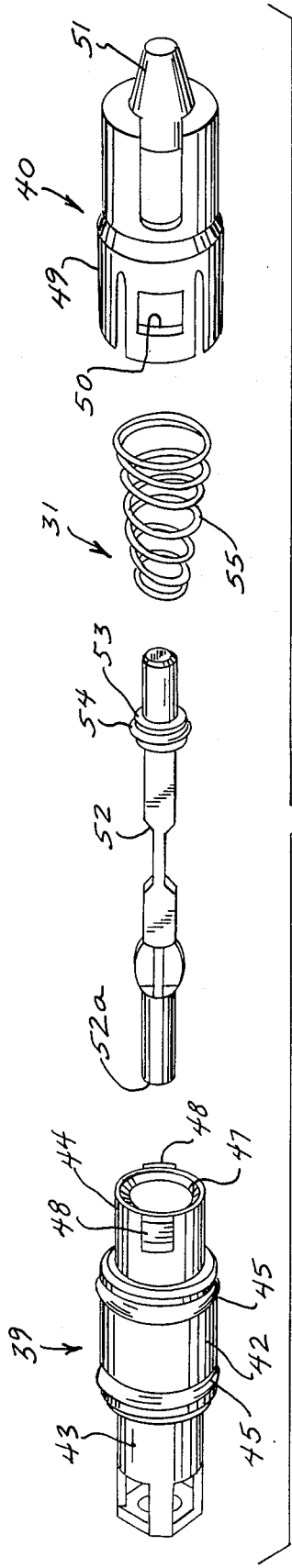
FIG. 5 is an exploded view of the components of one of the valves.
Figure 6:
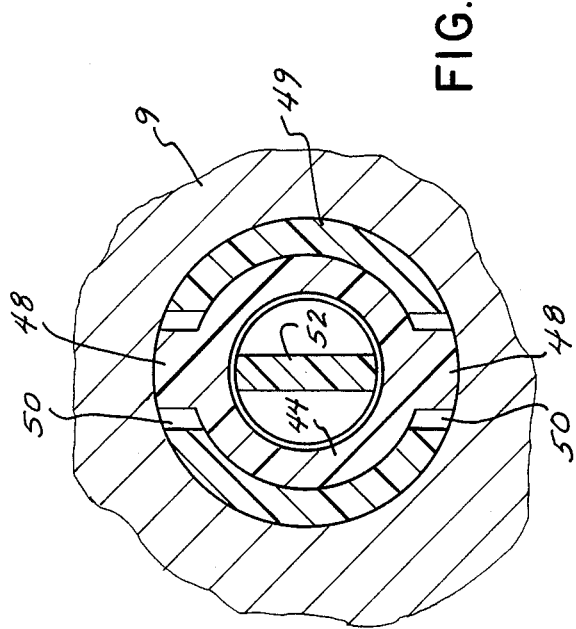
FIG. 6 is a transverse section taken on line 6—6 of FIG. 3.

In the present embodiment, and referring to FIGS. 3 and 4, a ball valve 30 is disposed in chamber 21 while a plunger valve 31 is disposed in chamber 23. Both valves will be open when the unit is assembled (FIG. 3), but will be closed when the housings are separated (FIG. 4).

Ball valve 30 is shown as comprising a resilient sealing retainer 32 tightly fitted within an enlarged outer terminus portion of passage 21, and forming a valve seat 33. Retainer 32 is provided with internal sealing lips 34. A valve ball 35 is biased toward seat 33 by a relatively strong spring 36 confined between the ball and a reduced shoulder 37 formed in the inner portion of passage 21.

Plunger valve 31 is illustrated in FIGS. 3–6 and comprises a housing 38 which is formed by a pair of separable sleeve-like portions, namely an outer portion 39 and an inner portion 40. Outer housing portion 39 comprises a cylindrical body 41 having an enlarged central body portion 42, an outer nose 43 of reduced diameter, and an inner body portion 44. A pair of roller type O-rings 45 are disposed in suitable annular grooves on central body portion 42 for sealing the latter against the walls of bell housing passage 23, and also for frictionally retaining the valve within the passage. Inner body portion 44 is provided with an annular inwardly facing valve seat 47 at its inner terminus, and also a plurality of circumferentially spaced prongs 48 on its outer periphery, for purposes to be described.

Inner valve housing portion 40 comprises a cylindrical body 49 of lesser diameter than body portion 44, and with body 49 having a plurality of circumferentially spaced openings 50 in its outer end portion for snap-in receipt of prongs 48. A resilient bumper 51 is disposed at the inner end portion of body 49 and extends outwardly therefrom for engagement with passage abutment 25.

An elongated plunger 52 is disposed within plunger valve housing 38 and, adjacent its inner end, is provided with a grooved collar 53 which receives an O-ring 54 therein. A spring 55 of lesser strength than ball valve spring 36 is confined between the inner end of valve housing portion 40 and plunger collar 53 and serves to bias plunger 52 outwardly, thus biasing O-ring 54 toward sealing engagement with seat 47 on outer housing 39. Plunger 52 is of a length and size such that, when O-ring 54 is seated, the plunger extends outwardly through and beyond nose 43 to form a tip portion 52a. See FIG. 4.

Prior to assembly of bell housing 9 to drive shaft housing 10, valves 30 and 31 are mounted into their respective passages 21 and 23. See FIG. 4. Valve 30 is easily assembled into passage 21 with ball 35 seated on seat 33. As to passage 23, spring 55 is placed within inner housing 40 and plunger 52 pressed into the housing against the spring. Outer housing 39 is then telescoped into inner housing 40 and over plunger 52 until prongs 48 snap into openings 50. The biasing force of spring 55 seats O-ring 54 against seat 47 and plunger tip 52a sticks outwardly beyond nose 43. In this position, and either prior to assembly of housing 9 and 10 or upon disassembly thereof, valve 30 is closed and prevents lubricating fluid from escaping outwardly from the interior of drive shaft housing and through passage 21. Likewise, valve 31 is also closed and prevents lubricating fluid from escaping outwardly from bell housing 9 through passage 23 and the further connections to passage 23, to be described.

It should be noted that plunger valve 31 is sealingly and frictionally held firmly in position within passage 23 by O-rings 45, but can readily be removed by merely manually pulling on nose 43, as with the fingers 56, to overcome the frictional resistance of O-rings 45.

When valves 30 and 31 are in place and closed, as in FIG. 4, assembly of bell and drive shaft housings 9 and 10 together will automatically cause the valves to open, and remain open. Comparing FIG. 4 with FIG. 3, as housings 9 and 10 are brought together, the plunger tip 52a engages ball 35. Since spring 36 is stronger than spring 55, plunger 52 will be forced back into nose 43 so that O-ring 54 unseats from valve seat 47 to open valve 31. Continued assembly movement of housing 9 and 10 causes nose 43 to enter the lipped portion 34 of retainer 32. Since valve 31 is seated on inner abutment 25, and provides a solid connector, nose 43 will force ball 35 off its seat 33, thus opening valve 30 and allowing fluid to pass through valve 30 and openings 43a. Nose 43 is also sealed within the lipped bore of resilient retainer 32, thus providing an anti-dribble function.

Figure 2:
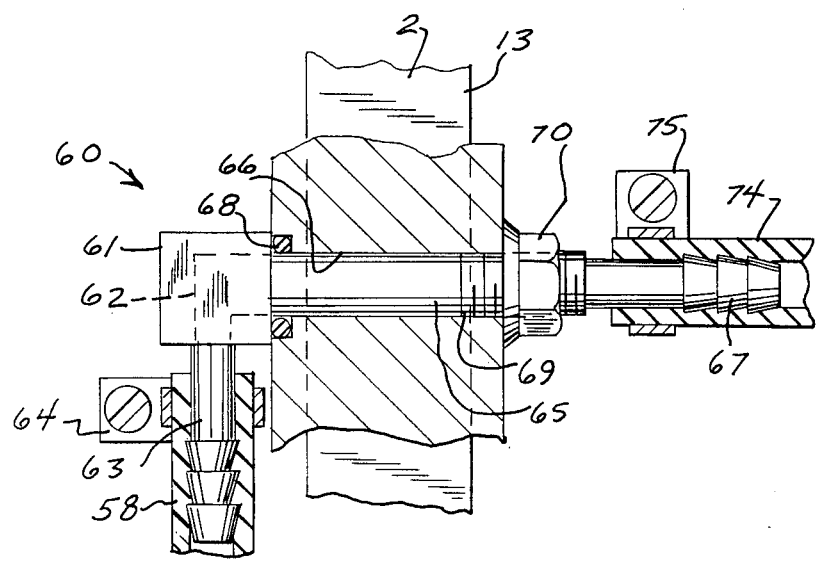
FIG. 2 is an enlarged fragmentary side elevation of the fluid flow-thru portion of the gimbal housing.

In accordance with certain other aspects of the invention, means are provided to connect angled passage 26 of bell housing 9 through gimbal housing 8 and into the interior of boat 3 without requiring special holes to be cut in transom 2 for lubricating fluid flow. For this purpose, a barbed fitting 57 is threaded to the outer terminus of passage 26, and one end of a short connector hose 58 attached thereto, as by a clamp 59. See FIG. 3. Referring now to FIGS. 1 and 2, a fitting assembly 60 is mounted to the inwardly extending portion 13 of gimbal housing 8 adjacent transom 2. Fitting assembly 60 comprises a generlly rectangular base 61 having an elbow passage 62 therein. A first barbed or end fitting 63 on one end of passage 62 mounts the other end of hose 58, as by a clamp 64. A second barbed fitting 65 on the other end of passage 62 is disposed at right angles to fitting 63. Second fitting 65 extends through an opening 66 in gimbal portion 13 and thus passed through transom opening 14, but within the gimbal. Fitting 65 is of such a length that its barbs 67 extend inwardly beyond transom 2 and into the boat for easy access thereto. An elbow could be provided if needed for space requirements.

Since fitting assembly base 61 is on the outboard side of transom 2 and is exposed to the ambient water, means are provided to seal base 61 to gimbal housing 8. For this purpose, the outer terminus of opening 66 is enlarged by a counter-bore to receive an O-ring 68 against which base 61 abuts. The inboard portion of second fitting 65 is provided with threads 69 which mount a nut 70. When nut 70 is tightened against the inner wall of gimbal portion 13, fitting 65 is pulled inwardly and fitting assembly base 61 is tightened up against O-ring 68 to provide a seal against inward water leakage.

It is also desired to provide means inboard of boat 3 for easy visual inspection of the level and condition of lubricating fluid within stern drive unit 1. For this purpose, and in the present embodiment, a transparent bottle-like generally enclosed reservoir container 71 is mounted to a wall of the boat, such as transom 2, as by a base 72 and strap 73. A hose 74 is mounted at one end to the barbed portion of second fitting 65, as by a clamp 75. The other end of hose 74 is mounted for fluid flow connection with container 71, as by a connector 76 at the container bottom. This is the sole fluid flow connection to container 71. The container is provided with a threadably removable cap 77 having a one-way valve 78 therein. Valve 78 prevents outward leakage of lubricant fluid from the container, but permits inward passage of air so that, during engine and drive unit cooling, lubricant can be sucked back into the system through housings 8, 9 and 10.

The various aspects of the invention provide a substantially improved lubricating arrangement for marine stern drive units. The lubricant is connected through the gimbal, bell and drive shaft housings and hence into the boat without requiring undesirable special connections through the transom itself. During operation of the unit, lubricant can freely flow between the bell and drive shaft housings, but upon disassembly, automatic shut-off valve means prevent lubricant from escaping. That is, one portion of the lubricant fluid is isolated within and cannot escape outwardly from the drive shaft housing. Likewise, another portion of fluid is isolated within the bell housing and its fluidly attached gimbal housing and visual inspection container, and cannot escape outwardly through the bell housing. The system is appropriately sealed against water ingress, and the inspection container prevents lubricant leakage but also permits backflow of fluid when needed.

Various modes of carrying out the invention are contemplated as being within the scope of the accompanying claims which particularly point out and distinctly claim the subject matter regarded as the invention.

We claim:

1. In a marine stern drive for mounting to an opening (14) disposed in the transom (2) of a boat (3) and with said stern drive being adapted for connection to an inboard mounted engine (4), the combination comprising:
   (a) a stern drive assembly including a bell housing (9) and a drive shaft housing (10), and with said housings being removably assembleable together,
   (b) interconnected lubricant fluid passage means (21,23,26) disposed in said housings,
   (c) fluid flow control valve means (30,31) disposed in said passage means, said valve means being open when said bell housing and said drive shaft housing are assembled, and said valve means being automatically closed when said housings are disassembled,
   (d) said passage means including a first passage (21) disposed in one of said housings (10) and a second passage (23) disposed in the other of said housings (9),
   (e) said first and second passages having outer end portions disposed in registry when said housing are assembled,
   (f) said fluid flow control valve means including opposed first (30) and second (31) valves disposed in said respective first and second passages,
   (g) said first and second valves having cooperatively engaging means (35,52,43) for opening both said valves when said housings are assembled,
   (h) said first and second valves each having means (33,35,36; 47,54,55) for automatically closing the respective valve upon disengagement of said cooperatively engaging means when said housing are disassembled,
   (i) said first and second valves (30,31), when closed, forming means to disconnect said fluid passage means and isolate lubricating fluid inwardly of the outer end portions of said first and second passages (21,23), respectively,
   (j) said first valve (30) comprising:
      (1) a first valve seat (33) and first seat engaging element (35) disposed in said first passage (21),
      (2) and a first spring (36) disposed in said first passage, said spring biasing said first seat engaging element against said first seat when said housings are disassembled,
   (k) said second valve (31) comprising:
      (1) a generally cylindrical valve housing (38) disposed in said second passage (23) and having a portion (51) abutting an inner end (25) of said second passage,
      (2) said valve housing forming an inwardly facing second valve seat (47) and an outwardly extending nose (43),
      (3) an elongated plunger (52) disposed within said valve housing, and with said plunger having an outer tip portion (52a),
      (4) a second seat engaging element (54) disposed on said plunger,
      (5) and a second spring (55) weaker than said first spring (36), said second spring biasing said second seat engaging element against said second seat when said bell housing and drive shaft housing are disassembled so that said plunger tip portion extends outwardly beyond said nose.

2. The combination of claim 1 wherein said valve housing (38) comprises:
   (a) a pair of housing elements (39, 40) which are telescopingly fittable together,
   (b) and snap fit means (48, 50) for joining said housing elements.

3. The combination of claim 2 wherein said second valve seat (47) is disposed on one of said housing elements (39) and faces inwardly within said second passage (23).

4. The combination of claim 1 which includes means (45) on said valve housing (38) and engageable with a wall of said second passage (23) for quick releasably holding said second valve within said second passage.

5. The combination of claim 1 wherein the construction is such that when said bell housing (9) and drive shaft housing (10) are moved toward assembled position, said plunger tip portion (52a) and said nose (43) engage said first seat engaging element in sequence so that said second valve (31) is first unseated and then said first valve (30) is unseated.

6. The combination of claim 1 or 5 which includes:
   (a) a gimbal housing (8) forming part of said assembly and with said gimbal housing being adapted for mounting to a boat transom opening (14),
   (b) and extension means (13) forming a part of said gimbal housing for carrying lubricant fluid from said passage means through the opening (14) in the transom.

7. The combination of claim 6 which includes:
(a) a fitting assembly (60) for providing a fluid connection between said passage means and the boat interior,
(b) said fitting assembly having a base (61) disposed on an outboard ambient-water-exposed side of said extension means (13),
(c) a fitting (65) extending inwardly from said base and through said extension means and adapted to protrude into the boat,
(d) and means (68-70) associated with said fitting for sealing said base to said extension means.

8. The combination of claim 1 or 5 which includes: a transparent lubricant inspection reservoir (71) adapted to be disposed inboard of the boat and with said reservoir being connected solely to said fluid passage means.

9. The combination of claim 8 which includes one way valve means (78) on said reservoir (71) for permitting suck-back of fluid from said reservoir toward said passage means while preventing discharge of fluid from said reservoir through said last-named valve means.

10. In a marine drive for mounting to a boat, the combination comprising:
(a) an assembly including a pair of members (9,10) and with said members being removably assembleable together,
(b) interconnected fluid passage means (21,23,26) disposed in said members,
(c) fluid flow control valve means (30,31) disposed in said passage means, said valve means being open when said members are assembled and said valve means being automatically closed when said members are disassembled,
(d) said passage means including a first passage (21) disposed in one of said members (10) and a second passage (23) disposed in the other of said members (9),
(e) said first and second passages having outer end portions disposed in registry when said members are assembled,
(f) said fluid flow control valve means including opposed first (30) and second (31) valves disposed in said respective first and second passages,
(g) said first and second valves having cooperatively engaging means (35,52,43) for opening both said valves when said members are assembled,
(h) said first and second valves each having means (33,35,36;47,54,55) for automatically closing the respective valve upon disengagement of said cooperatively engaging means when said members are disassembled,
(i) said first valve (30) comprising:
(1) a first valve seat (33) and a first seat engaging element (35) disposed in said first passage (21),
(2) and a first spring (36) disposed in said first passage, said spring biasing said first seat engaging element against said first seat when said members (9,10) are disassembled,
(j) said second valve (31) comprising:
(1) a generally cylindrical valve housing (38) disposed in said second passage (23) and having a portion (51) abutting an inner end (25) of said second passage,
(2) said valve housing forming an inwardly facing second valve seat (47) and an outwardly extending nose (43),
(3) an elongated plunger (52) disposed within said valve housing, and with said plunger having an outer tip portion (52a),
(4) a second seat engaging element (54) disposed on said plunger,
(5) and a second spring (55) weaker than said first spring (36), said second spring biasing said second seat engaging element against said second seat when said members (9, 10) are disassembled so that said plunger tip portion extends outwardly beyond said nose.

11. The combination of claim 10 wherein said valve housing (38) comprises:
(a) a pair of housing elements (39,40) which are telescopingly fittable together,
(b) and snap fit means (48, 50) for joining said housing elements.

12. The combination of claim 10 which includes means (45) on said valve housing (38) and engageable with a wall of said second passage (23) for quick releasably holding said second valve within said second passage.

13. The combination of claim 10 wherein the construction is such that when said members (9, 10) are moved toward assembled position, said plunger tip portion (52a) and said nose (43) engage said first seat engaging element in sequence so that second valve (31) is first unseated and then said first valve (30) is unseated.

* * * * *

UNITED STATES PATENT AND TRADEMARK OFFICE
CERTIFICATE OF CORRECTION

PATENT NO. : 4,872,531

DATED : 10-10-89

INVENTOR(S) : Gary L. Meisenburg et al

It is certified that error appears in the above-identified patent and that said Letters Patent is hereby corrected as shown below:

Column 2, line 41, delete "Housing" and substitute therefor --Housings--.

Column 2, line 42, delete "well-know" and substitute therefor --well-known--.

Column 4, line 46, delete "generlly" and substitute therefor --generally--.

Column 4, line 52, delete "passed" and substitute therefor --passes--.

Column 6, line 7, claim 1, delete "housing" and substitute therefor --housings--.

Column 6, line 15, claim 1, after "and" insert --a--.

Signed and Sealed this

Eighteenth Day of September, 1990

Attest:

HARRY F. MANBECK, JR.

*Attesting Officer*   *Commissioner of Patents and Trademarks*